United States Patent
Pelle

[11] Patent Number: 5,937,048
[45] Date of Patent: Aug. 10, 1999

[54] PROGRAM CONTROLLED SWITCH PROVISIONING

[75] Inventor: Michael J. Pelle, Waldorf, Md.

[73] Assignee: Bell Atlantic Network Services, Inc., Arlington, Va.

[21] Appl. No.: 08/870,240

[22] Filed: Jun. 5, 1997

[51] Int. Cl.[6] .................................................. H04M 3/42
[52] U.S. Cl. .......................................... 379/201; 379/207
[58] Field of Search .................................. 379/201, 207, 379/230, 88.17, 88.25, 243, 219, 9, 10, 914; 345/340–346; 364/146, 188

[56] References Cited

U.S. PATENT DOCUMENTS

| | | | |
|---|---|---|---|
| 5,012,511 | 4/1991 | Hanle et al. | 379/88.25 |
| 5,222,125 | 6/1993 | Creswell et al. | 379/201 |
| 5,241,588 | 8/1993 | Babson, III et al. | 379/201 |
| 5,347,564 | 9/1994 | Davis et al. | 379/207 |
| 5,353,339 | 10/1994 | Scobee | 379/207 |
| 5,402,477 | 3/1995 | McMahan et al. | 379/201 |
| 5,404,396 | 4/1995 | Brennan | 379/201 |
| 5,416,833 | 5/1995 | Harper et al. | 379/265 |
| 5,428,679 | 6/1995 | French | 379/201 |
| 5,450,480 | 9/1995 | Man et al. | 379/201 |
| 5,461,669 | 10/1995 | Vilain | 379/350 |
| 5,481,601 | 1/1996 | Nazif et al. | 379/207 |
| 5,483,585 | 1/1996 | Parker et al. | 379/201 |
| 5,491,742 | 2/1996 | Harper et al. | 379/201 |
| 5,511,113 | 4/1996 | Tusaki et al. | 379/112 |
| 5,511,116 | 4/1996 | Shastry et al. | 379/201 |
| 5,528,677 | 6/1996 | Butler et al. | 379/196 |
| 5,533,116 | 7/1996 | Vesterinen | 379/243 |
| 5,619,562 | 4/1997 | Maurer et al. | 379/207 |
| 5,644,619 | 7/1997 | Farris et al. | 379/27 |

*Primary Examiner*—Harry S. Hong
*Assistant Examiner*—Benny Q. Tieu
*Attorney, Agent, or Firm*—McDermott, Will & Emery

[57] ABSTRACT

A method and system for provisioning program controlled switches in a public switched telephone network using a Recent Change Memory Administration Center wherein verbal orders to a business office are translated to machine language, delivered to the Recent Change Memory Administration Center, and processed into a first category of orders susceptible of automatic processing and entry into the intended switch, and into a second category of orders requiring manual processing. The second category of orders which require manual processing are first automatically processed to overlay orders directed to the same switch and local link connected to that switch. Following such automated order overlaying, the overlayed orders are manually processed and entered into the intended switch. Provision is made to deliver the data resulting from the manual processing to further processing to compare that data to the data actually entered into the switch. If the data has been correctly entered into the switch, a verbal indication that the service has been installed is verbally delivered to the customer.

20 Claims, 2 Drawing Sheets

| DEC.15 | | DEC.16 | DEC.17 |
|---|---|---|---|
| 1 | DEC.17 | 9 | 15 |
| 1-A | | 10 | 1 |
| 2 | DEC.15 | 1-D | |
| 3 | DEC.16 | 11 | |
| 1-B | | 12 | |
| 5 | | 1-E | |
| 6 | | 13 | |
| 1-C | | 14 | |
| 7 | | | |
| 8 | | | |

PROGRAM CONTROLLED SWITCH PROVISIONING

FIELD OF THE INVENTION

The present invention is directed to switched telephone communication systems using program controlled switches and more particularly to an operational support system and method for provisioning such switches for the activation of services and providing follow up confirmation and status information.

BACKGROUND ART

In the operation of public switched telecommunications networks (PSTNs), Recent Change Memory Administration Centers (RCMACs) take service orders from business offices in response to customer calls and populate those service orders with the services requested by customers. A recent change memory administration center (RCMAC) is a technical support center where a group of technicians operate work stations in communication with a system for programming telephone company switches to enter changes in the profile data stored in the memories of the switches. For example, if a subscriber purchases a new telephone service, an RCMAC technician might enter the data for modifying that subscriber's profile in the serving end office switch, to activate the newly subscribed service. In existing RCMAC systems, the automated network provisioning elements reject and direct memory change requests that they cannot automatically process to such manual processing by the RCMAC staff. This process, however, involves printing the rejected orders and manually processing those orders to assign and complete the memory administration work. There has been no automated administration, assignment, tracking or measurement of the work by the actual technicians.

The function of a recent change memory administration center (RCMAC) is manual service order entry, for entering and modifying subscriber profile data stored in the memories of telephone company central office switches. A variety of automated systems are in use today for activating or modifying telephone subscriber's services, including updating the memories in the central office switches. However, no matter how highly automated, those systems invariably cannot process one hundred percent of all service orders. Some orders cannot be completed automatically, and any portions of such uncompleted orders that relate to switch memory administration functions fall out to an RCMAC for manual order entry processing.

It may be helpful first to consider how orders currently reach the RCMAC. In a typical PSTN today, a customer calls a business office to order a new telephone service associated with the customer's telephone number, for example dial tone, call waiting or caller ID. An agent at the business office enters the relevant data into the provisioning system(s) of the PSTN. For the switch memory related functions, the provisioning system(s) processes the data into appropriate format and hands off the formatted data to a system named 'MARCH' (Memory Administration Recent Change System). MARCH qualifies the data, and if the data meets the relevant qualification criteria, MARCH transmits the data to the appropriate central office switch for entry into memory.

However, MARCH also recognizes a certain percentage of memory orders as unacceptable for such automatic processing. The service order may not qualify for automatic flow-through directly to the switch because of the order format or the type of service ordered. Current examples of service orders that are not amenable to the automatic entry into the switch include orders for Centrex and ISDN services. It has been estimated that March disqualifies 25% or more of all memory related service orders.

In the existing system, MARCH directs or 'dumps' the unaccepted orders to a batch printer in the RCMAC for manual entry. The printer output is termed a 'PAC'. A technician in the RCMAC translates one message from the PAC output by the MARCH system into a format appropriate for entry into the particular switch to effectuate the customer's service request. For this purpose, the technician operates a terminal in communication with MARCH, to input the translated message back into MARCH for final processing and delivery to the serving central office switch and entry into memory.

MARCH will typically hold orders until the date they are due. If revisions come in before entry into the switch, MARCH will modify the order essentially by overlaying the revision onto the existing order. However, once the RCMAC instructs the MARCH to process a day's flow-through work, MARCH disqualifies any subsequent revisions relating to an order and prints those orders out in one of the day's PACs. One of the technicians in the RCMAC manually enters each subsequent revision, in the manner outlined above. Also, for the cases where the order is otherwise disqualified, e.g. for a service such as ISDN that is not amenable to flow-through automated processing, MARCH will print out all of the revisions serially in the PAC(s). The technician must then process each order and revision thereof to finally produce the memory data for input to the switch to provide the customer the actual service(s) requested.

The PAC printed output of the various orders provides no tracking of the orders, not even a list or orders by order number.

In this manual order processing and tracking of the RCMAC work load 1200 to 2000 orders typically print to high speed printers from the MARCH operational support system on a daily basis. The paper orders are then stripped and sorted into work bins. The clerical force picks up work and enters service order data into MARCH. Work is complete when all bins are empty. This paper intensive environment causes the following problems, among others:

Misplaced orders

Lost orders

Inability to quantify work load

Inability to measure productivity

Inability to manage completion of work

Labor intensive and difficult to administer, track, or measure the receipt, completion of work load offered daily to the RCMAC.

Bell Communications Research, Inc. (Bellcore) has proposed a Provisioning Analyst Work Station (PAWS) as a workstation based system designed to be an interface to, and single point of contact with other systems in a PSTN. Among other things the system is proposed to streamline service request exception and work processing and perform other related administrative tasks. The system comprises an umbrella program which includes an RCMAC module. However, the PAWS system merely computerizes the same process steps which now are performed manually in the manner described above. Each order is treated as a separate order with the result that there is no reduction in the number of involved processing steps. Additionally, the PAWS system, being an umbrella system designed to perform a multiplicity of tasks, involves very significant hardware expense.

The patent literature has previously addressed various aspects of switch provisioning to provide new services.

U.S. Pat. No. 5,347,564 issued Sep. 13, 1994 to Mark F. Davis et al. and is assigned to The Chesapeake and Potomac Telephone Company of Maryland, i.e. a subsidiary of the assignee of the instant application.

The Davis et al. Patent discloses an automated translation input system to convert Mechanized Translation System (MTS) orders into Recent Change Messages that can be loaded directly into a program controlled switch. The disclosed system permits use of the output of the MTS, which would otherwise constitute a printed form, for input to the Automated Translation Input System (ATIS). The ATIS analyzes the forms and the associated Recent Changes, and the Recent Change Messages are prepared. The resulting Recent Change Messages are inspected by the SCC technician who, through a manual option in the ATIS system, gives the command to download the translations directly into the switch.

U.S. Pat. No. 5,511,116 issued Apr. 23, 1996 to Shastry et al. The Shastry et al. Patent relates to provisioning customer services in an advanced intelligent network (AIN). Specifically, this Patent teaches use of a service management system (SMS) to create data tables for organizing data used by call processing procedures. The data tables and any call processing records created on the SMS are loaded into the MSAP application in a service control point (SCP) for actual execution of call processing. During call processing, the SCP receives a query from a switching office of the telephone network and executes a call processing record (CPR) stored in the SCP. Table nodes in the CPR facilitate access to information stored in the tables as part of the procedure for formulating the response message for communication back to the switching office.

U.S. Pat. No. 5,481,601 issued Jan. 2, 1996 to Nazif et. The Nazif et al. Patent also relates to service creation in an AIN environment. Specifically, this Patent teaches use of a service creation and management application running in a SMS service management system which is illustrated in FIG. 2 of that patent. The creation application apparently is an application sometimes referred to as 'SPACE' that may be used to program the call processing records (CPRs) into an integrated service control point (ISCP). As disclosed, a separate MSAP execution application runs in the services control point (SCP). The Nazif et al. Patent discloses the specific interface between the creation application and the MSAP execution application to facilitate transfer of CPRs created in the service management system to the SCP for storage and execution. The interface also facilitates activation, monitoring, tracing, auditing and other management of telecommunication services provided through execution of the CPR in the SCP.

As shown in FIG. 2, the service management system includes a user work station, Program Language Data Translator, Encoder/Decoder, Message Constructor/Deconstructor and Data Communications Manager. Through the work station, a technician operates the creation application to create CPRs. The application generates graphs of the desired services for display to the user via the work station. Such a graph is useful for an operator to create and understand the telephone service being created. However, the execution application cannot interpret the graph directly. The CPR graph is translated into a binary representation which can be used to process calls in the execution environment of the SCP. The Data Communication Manager adds header information to the CPR and transfers the resulting data to the SCP which stores the binary representation of the CPR in the Data Base.

The Patent also describes a number of messages, apparently permitting a technician working through a terminal of the service management system to audit the database records of the SCP.

U.S. Pat. No. 5,450,480 issued Sep. 12, 1995 to Susan K. Man et al. The Man et al. Patent also relates to service creation in an AIN. FIG. 2 of that patent shows the service management system (SMS) utilizing SPACE type service creation application. The SMS communicates call processing records (CPRs) to the MSAP execution application running in the services control point (SCP). The emphasis of this patent, as indicated by the summary and abstract, is on a specific procedure for creating CPRs through the graphical user interface provided by SPACE, for example by prompting an operator and receiving selections of optional and required nodes for the graph of the service and enabling the selected nodes in the general service specification of the CPR.

U.S. Pat. No. 5,241,588 issued Aug. 31, 1993 to David L. Babson, III and Thomas C. Ely. The Babson, III et al. Patent pertains to a method and apparatus for creating and implementing customer service procedures for individual customers of an AIN type network and provides for the creation and execution of customized call processing information records stored in an SCP, to provide desired services. The records are created by an operator at a display terminal to provide a visual representation of the desired service in the form of a flow chart referred to as a service "graph". New customized services are created or existing services are modified in a graphical environment by creating or modifying a customer's service graph on the display terminal. Data corresponding to the service graph is then stored in the SCP.

U.S. Pat. No. 5,533,116 issued Jul. 2, 1996 to Timo Vesterinen. The Vesterinen Patent discloses a network management system for managing a telecommunication network having a variety of different exchanges having different interfaces and/or different internal command languages. Vesterinen recognizes that large telecommunication networks have many exchanges of different types having different software. The exchanges are continuously replaced, modified, and upgraded. Software is updated, and often the software changes cause changes in the interface with the management system. The syntax of commands may change, new parameters are added, new fields appear in the command responses, or completely new commands may be generated. The different management interfaces make it difficult to administer the data in the exchanges on a day to day basis, for example to delete or add subscribers, modify subscriber services, etc.

Vesterinen provides a network management system that allows the user to operate in a high-level element independent language. The system provides the necessary conversions between the high level language and the commands and responses for the specific network elements.

U.S. Pat. No. 5,528,677 issued Jun. 18, 1996 to Butler et al. The Butler et al. Patent discloses a system for implementing subscriber service requests in a telephone communication network, particularly one in which the various switches of the network use different communication protocols.

FIG. 1 of that patent provides a schematic representation of a telephone network including access stations, local exchange carrier central office switches, interexchange carrier switches, service control system (SS7), and computers. FIGS. 2A–2D illustrate the preferred architecture for providing requested services to subscribers. As shown therein, the network includes an access manager, a service manager, service element managers, and the actual network elements.

As shown in FIG. 2A, the network includes access terminals in communication with the access manager. The access manager stores a profile of available subscriber services, provides access security and a gateway into the network and to the network services, and provides transaction management for service requests. For example, the access manager determines whether a subscriber is authorized to present service requests and determines whether requested services are authorized, before transmitting the requests. The transaction control system within the access manager communicates the requests to a service manager shown in detail in FIG. 2B.

The service manager is configured to receive all service requests which enter the network and, in general, provide overall transaction management. The service manager determines which components of service element managers are operable for processing requests, selects those appropriate components for each service and transfers the service request to the appropriate element manager(s). Service element managers (FIG. 2C) receive and process service requests under the management of service manager. Each service manager develops instructions or data usable by the network elements for implementing the requested service or service change.

U.S. Pat. No. 5,511,113 issued Apr. 23, 1996 to Tasaki et al. The Tasaki et al. Patent discloses a specific technique for recording intelligent network service related charging information on the AMA journal of a service switching point (SSP) type central office switch. When a subscriber at terminal requests an intelligent network type 'additional' service, the SSP sends a request for the additional service to the service control point (SCP). The SCP executes control for the additional service. The SCP also creates charging information related to the additional service and sends that information to the SSP. The SSP creates charging information related to the ordinary service. The SSP records detailed charging information combining both the charging information for the additional service and the charging information related to the ordinary service.

U.S. Pat. No. 5,483,585 issued Jan. 9, 1996 to Parker et al. Element managers have been developed by the switch vendors to provide a management interface into their respective switches. The element manager utilizes command protocols compatible with the switch, and the element manager itself can be managed by a central computer. The Parker et al. Patent discloses a methodology for communication between the central computer and each element manager, to configure individual switches to add or remove services.

The Parker et al. methodology uses CMIS/CMIP protocol messaging. The central computer sends M-CREATE, M-SET and M-DELETE type message to create, modify or delete service information. The element manager provides corresponding response messages when it has completed the respective operations.

In the Parker et al. methodology, the central computer sends an initial set of requests relating to a service to the element manager and monitors the response messages to determine if the element manager successfully performed all of the requested operations. If the element manager fails to perform one or more of the requests in the initial set, the computer sends a second set of requests canceling any requests in the initial set that were successfully completed by the element manager.

U.S. Pat. No. 5,461,669 issued Oct. 24, 1995 to Bernard Vilain. The Vilain Patent discloses a telecommunication network comprising switching nodes, each of which includes a call and service control point and a bearer control point switch. The call and service control point performs all signaling functions related to call control and service control, such as call set-up, supervision and clearing down. The bearer control point in turn performs the switching and signaling functions related to actual connection control.

U.S. Pat. No. 5,404,396 issued Apr. 4, 1995 to Steven Brennan. The Brennan Patent pertains to the control of call features within a stored program controlled telecommunication switching system and to a system for managing the interaction of a plurality of such features within a network. The disclosed feature management software controls switch based features, features provided by an adjunct, and SCP features.

A service switching platform has logic for completion of calls between subscribers and software blocks for implementing specific call features in response to network events produced by subscriber actions. A feature manager associated with each call feature receives signals from the network indicative of the network events produced by subscriber actions and provides control signals to the call feature software. A database stores information related to each subscriber within the network who has the capability of invoking and controlling the call features. A feature interaction manager is connected between the feature manager and the database for receiving signals from the feature manager indicative of events received by the manager. In response to the received events and the information stored within the database related to the subscriber which caused the events, the feature interaction manager instructs the feature manager on what signals to send to the feature logic software, in order to interactively implement the features invoked by the events produced by the actions of the subscriber.

U.S. Pat. No. 5,402,477 issued Mar. 28, 1995 to Michael L. McMahan and Michele B. Gammel. The McMahan et al. Patent pertains to a method and system for configuring a programmable telephone. A user establishes and accesses a special service by using the function keys of the telephone. The telephone offers a variable array of control function keys, through use of a touch screen overlaid on top of an LCD display, for establishing special services. The telephone connects to a switch through network line (FIG. 2). Telephone stores a list of services offered through the network and the switch. The McMahan et al. Patent provides a method for automatically configuring the telephone to offer the user only those services which are actually supported by the switching network.

FIG. 4 of the patent depicts the execution of the steps involved in configuring the telephone. In one step, the telephone initializes a service to be the first service in the list of possible available services. Step two initializes a first procedure in the list of possible procedures for establishing the service. In step three, the telephone communicates with the network in order to execute the procedure. The determination is then made as to whether or not the procedure is established. Steps 108 and 114 deal with the possibility of more procedures.

U.S. Pat. No. 5,353,339 issued Oct. 4, 1994 to John D. Scobee. Scobee discloses a system that responds automatically to a request for a special service by (1) designing a circuit required to support the requested special service, (2) identifying network facilities and configurations for implementing the designed circuit, (3) assigning those facilities to the circuit, (4) causing the various equipment providing the facilities to be interconnected to implement the service, (5) verifying the integrity of the special service, and (6) delivering the service to the customer.

The system further provides direct transport facilities in the inventory of network facilities at the level required to provide the special service between the particular points in the network that must be interconnected to provide the service. The system will employ procedures for further identifying or developing transport facilities if sufficient facilities at the necessary level are not already available to meet the customer's request.

U.S. Pat. No. 5,222,125 issued Jun. 22, 1993 to Creswell et al. The Creswell et al. Patent discloses a telephone switching system that has an adjunct unit operative for allowing telephone subscribers to control the manner in which they receive telephone calls.

To initiate the service, a user dials a telephone station number associated with adjunct. A connection is made to terminal and the subscriber receives a unique telephone service number. The user is assigned a PIN and a security code group of Caller Identification Numbers (CINs). The adjunct stores a data record for the subscriber (see FIG. 2). Once the system has established the subscriber's service, upon the entry of a certain CIN number, the calling party is not billed for the associated call. The telephone call is automatically billed to the subscriber.

The subscriber may call their own service telephone number to reach the adjunct, then upon the entry of the CIN and the PIN, the subscriber can establish a long distance telephone connection to a desired telephone station. The charges for this call from the subscriber are billed in a prearranged manner, e.g. to his home telephone number, on his credit card, etc. The subscriber can also program various personalized services in the adjunct, such as call forwarding, caller screening and other features.

U.S. Pat. No. 5,428,679 issued Jun. 27, 1995, to Phil H. French and is assigned to C&P of Maryland, a subsidiary of the assignee of the instant application. The French patent describes an automated method and system for confirming the installation of new services in a PSTN and for providing prompt and convenient correction of errors and automatic maintenance confirmation to insure that an reported problems have been remedied.

The method and system utilize an adjunct processor for effecting voice messaging services through the use of an Interactive Voice Processor (IVP). This is connectable to the switches of the system and to subscriber lines connected thereto. A Local Area Network (LAN) is connected via a first data network to such switches and via the adjunct processor to a second business functions data network. A second adjunct processor is connected to receive data representative of special services ordered by subscribers and also connected to the IVP and LAN. A control processor is connected to the LAN for accessing the first and second data networks and databases connected thereto. The second adjunct processor is responsive to data representative of the special services ordered and provides input signals to the IVP and to the LAN. The IVP responsive to signals from the second adjunct processor initiates connection to the subscriber line to receive the ordered special services and delivers thereto a voice message confirmation of the installation of the service. Further, the control processor accesses and displays data representative of the service ordered and the signals representative of that service delivered to the switches and adjunct processor, with such control processor having an input terminal for receiving input effective to change the data provided to the switches and adjunct processor.

DISCLOSURE OF THE INVENTION

It is a primary object of the present invention to eliminate or ameliorate the above described problems.

It is another object of the invention to significantly reduce the volume of paper required, handled, printed, and mishandled, to eliminate the need for contracted support for high speed printers, and relieve the MARCH computer of the necessity to manage 1.5 gigabyte print jobs five to six times a day.

It is another object of the invention to cut Work PAC processing and printing time in MARCH from a procedure now taking up to two hours to a semi-automated procedure taking approximately fifteen minutes, and to improve the overall RCMAC productivity.

As an important element of achieving the foregoing objects is an important feature of the invention to effect overlay of multiple orders to eliminate the working of the same order more than once, a significant improvement in the face of the fact that some orders are received five to ten times in a single day.

It is yet another object of the invention to provide tracking of a large body of statistics and performance criteria which enables significant improvement in the administration and efficacy of the system.

SUMMARY OF THE INVENTION

The invention provides a fully automated management and tracking of the orders output from MARCH to the RCMAC for manual entry. An RCMAC technician works at one of a number of X-terminals connected through a local area network to a host computer running a unique RCMAC Tracker Software Application. The host computer in turn communicates with the main frame computer running as MARCH. According to one embodiment, one of the technicians may open a 'MARCH' window and request a PAC. According to another embodiment, the terminal or the host computer may periodically request the PAC, without need for human intervention. Instead of requesting that MARCH send the PAC to the batch printer, as in the past, the new PAC command requests that MARCH download the PAC to the particular technician terminal. As MARCH transmits the PAC to the terminal, the orders flow across the display screen until the PAC is finished. The last item of the PAC is a list of orders, and that list remains displayed on the terminal screen (in the MARCH window) when the PAC download is complete. The downloaded data for the particular terminal, in this case the entire PAC and the accompanying list, is stored in the host computer.

As part of the processing of the PAC data for storage, a C-program running in the host computer takes the PAC data and cuts that data into individual orders. For each order, the host computer stores a database entry in an INFORMIX database and stores the actual order as an ASCII code file. Each database entry contains a variety of data fields relating to certain aspects of the order that may be used to classify the order, such as the order number, the telephone number, the switch, etc. As the program cuts out the individual orders, it extracts the appropriate data from the orders to populate the data fields in the corresponding database entries.

The RCMAC Tracker Software Application is an application program written for an INFORMIX database. The application provides a variety of windowed access screens to obtain information from the database and to launch related applications.

The RCMAC Tracker Software Application includes two components or modules. The first module manages and tracks the manual order processing. The second module provides an internal trouble ticket processing system.

The module for managing and tracking manual order processing actually drives the work to individuals at respective X-terminals, automatically. Typically, orders for memory related work for one central office switch map to a plurality of different ones of the terminals. As such, several people may work on orders relating to any one switch. The RCMAC Tracker Software Application provides a notification window on each terminal. The Tracker Software prioritizes the orders for each office by the date due and generates a display of the next date due order, for an office mapped to each respective terminal, in the notification window shown on the terminal.

When a technician selects an order to work on, the terminal notifies the host of the technician's acceptance of that order. The host records the acceptance, including the log-on ID of the accepting technician, in the database. If another technician attempts to select the same order, the host computer provides a message in the notification window indicating the prior acceptance. Anyone checking the status of the order can review the entire database listing for the order, in this case including the acceptance by a particular RCMAC technician for processing.

Also, in response to the acceptance of the order, the system opens an order display window on the terminal and displays the full order. The order displayed is essentially the same as the order that which was previously printed out in the PAC from MARCH, and the technician or user has the option to print out the accepted order on a local printer.

Typically, the order is several pages long (up to one hundred pages). One section of the order includes assignment information, and another section includes service and equipment information. The order window provides a split screen display, with the assignment information in one section of the window and the service and equipment information in the other section of the window. The window display program permits the user to independently scroll through each section of the order, for example to match up related pieces of assignment information and service and equipment information.

It is a key feature of the invention that the RCMAC Tracker Software Application running in the host computer overlays revisions on a service order, to produce a single final service order for delivery to the technician. All prior versions or revisions of the actual order are deleted at the time of access or acceptance of the order by the technician. When the RCMAC technician selects the order, the system presents and displays only the final revised form of the order. The order is overlayed in the ASCII file archive which is called up. On the other hand multiple copies of the information as received are retained in the basic database. The methodology of the invention makes it possible to translate two and a half hours of PAC printing to a processing time of about three minutes.

As described, the RCMAC Tracker Software Application provides a windowed display of the order to the technician via the technician's X-terminal. While the terminal displays the order, the technician will open a separate MARCH window on the terminal. The technician reviews the order and writes the relevant order information into the MARCH window. The order entry involves manual typing of information into a template in the MARCH window. In the current implementation of the Software Application, if appropriate, the technician can cut and paste information from the order window directly into the MARCH template. Pursuant to another embodiment, the system may provide the intelligence for hot key or tool-bar entry of relevant information (such as USOC codes) and/or automatic translation of certain order fields into appropriate entries for use in the particular MARCH template. When the order entry job is complete, the host computer forwards the message to MARCH for entry into the particular central office switch. The host also makes a notation of completion in the database, including the log-on code of the technician who processed the order.

The order database, formed during processing of the PAC, is an INFORMIX database. The order receipt processing extracts various useful information from each order and places the information in the appropriate field of an entry in the database. As the order is processed in the RCMAC, the database application program adds appropriate status information in the listing. Although the actual orders are stored for a relatively short period of time (e.g. thirty days), the database entries are stored longer (e.g. a year) for historical analysis.

In addition to the management of order entry, the database also provides a variety of work flow tracking tools. For example, the database is searchable for any of a variety of different types of classification information, such as by switch or by type of service (e.g. Centrex or ISDN). The database can provide reports of the number of orders processed by each RCMAC technician, the number of orders received within a given time period, the number of orders processed in a given time period, the percentage of orders completed by due date, etc.

The analytical tools also help in further improvements to the automated flow-through type order processing. For example, the database may show that all orders of a particular type are dropping out to the RCMAC, such as orders relating to a remote switch module where MARCH was not aware of that module associated with the particular switch. Upon recognition of this problem with the flow-through processing, a new table can be developed in MARCH to facilitate automatic handling of the particular type of orders. This increases the percentage of orders automatically flowing through to the switches and reduces the manual workload on the RCMAC.

As noted above, the RCMAC Tracker Software Application also facilitates response to trouble tickets. A trouble ticket is generated when a technician in the field or an agent in the business office with a customer complaint, calls in to the RCMAC indicating that a service order has not resulted in actual activation of a service. For example, a technician installing new telephone service might find that the switch is not providing dial tone over a particular piece of office equipment. The technician calls the RCMAC with the order number to determine if the switch has been programmed to provide dial tone via that equipment.

In response to a trouble ticket call, the RCMAC technician opens a Tracker window on his or her X-terminal and enters the order number. The trouble ticket module of the RCMAC Tracker Software Application accesses the database on the host computer to determine the current status of the order and display that status on the terminal . The technician can provide the calling party with immediate feedback of the order status. The database entry for each order can be accessed using any data in the database entry, such as telephone number, service order number, etc.

The trouble ticket response portion of the system currently processes only the orders downloaded in the PACs for manual entry. The invention also comprehends that the RC-MAC Tracker Software Application also may track flow-through order processing by MARCH as well as processing of 'rejects' (orders passed through MARCH that the switch rejects for any reason).

Pursuant to another feature of the invention the RCMAC Tracker Software Application may communicate with terminals used in the network test center. When a technician in the test center inputs a trouble ticket relating to a particular order, the Software Application may notify the technician of any order pending or completed related to that number. Without such correlation of order processing, the test center technician today may not know that the order is pending in the RCMAC for processing and might enter the relevant data directly in the switch to clear the trouble that the customer reported.

According to a still further feature of the invention, upon completion of an order by the Tracker Application a Tracker feed is delivered to the Advanced Assurance Voice Platform (ASAVP). The ASAVP parses the order and determines what should be in the switch. The ASAVP then polls the switch to determine what it has implemented and matches the two. It there is a reject it is immediately returned to Tracker. The error may be a typographical error but is more likely an error originating in the business office. That office must deal with the almost infinite variety and combination of variables that can be assembled into complex service orders and human error is virtually inevitable. And it is just such complex orders that are directed to the RCMAC for handling. It is a feature of the invention that Tracker and ASAVP may be run in the same physical computer (although this is not essential) and that the functions of the two may be combined to provide a high order of improvement of the switch provisioning process.

BRIEF DESCRIPTION OF DRAWINGS

FIG. 2 is a diagrammatic illustration of a series of order PACs dumped to the RCMAC for handling pursuant to existing or prior art manual procedures.

BEST MODE FOR CARRYING OUT THE INVENTION

Figure 1:
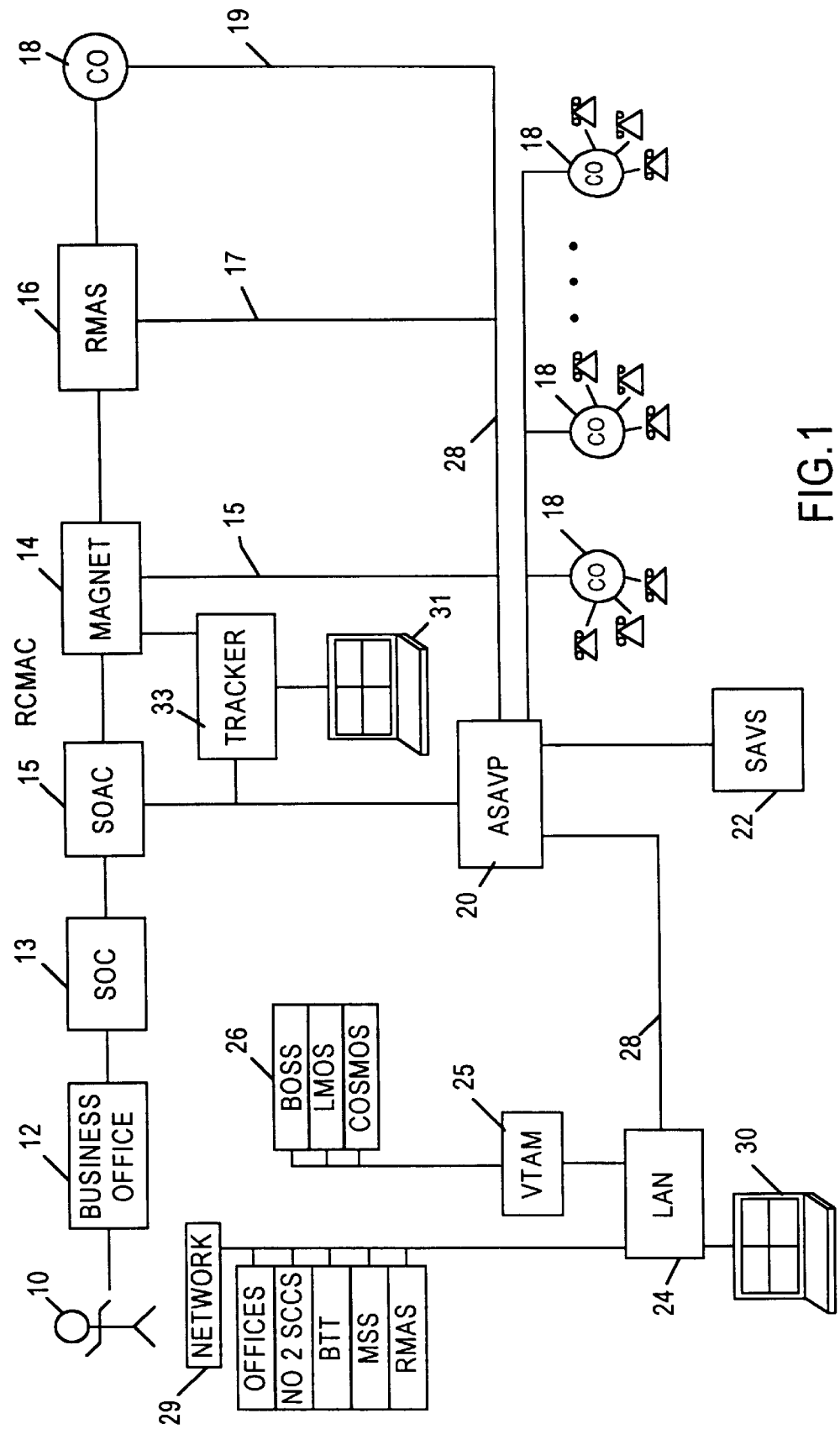
FIG. 1 is a diagrammatic illustration of the architecture of the provisioning system according to the invention.

Referring to FIG. 1 there is shown a diagrammatic illustration of the architecture of the provisioning system according to the invention. In that figure, a customer at 10 may call into a business office (BO) 12 to order a new service. The service is negotiated with the customer, matching the customer needs with the available products and services. The due date for installation is negotiated and scheduled. Before ending the call with the customer, the service representative recaps the service request to insure that the customer order accurately reflects the customer's requirements. The service order is then issued or released to the Service Order Processor (SOP) systems 13. The SOP checks the order for format accuracy and determines what centers or systems should receive the service order. The service order is next sent to the Service Order Analysis and Control System (SOAC) 15. Here the order is validated and checked for format accuracy.

From SOAC the processed service order is sent to the Recent Change Memory Administration Center (RCMAC), which is here indicated by the legend RCMAC. Recent Change Memory Administration Centers (RCMACs) take service orders from business offices in response to customer calls and populate those service orders with the services requested by customers. A recent change memory administration center (RCMAC) is a technical support center where a group of technicians operate work stations in communication with a system for programming telephone company switches to enter changes in the profile data stored in the memories of the switches. For example, if a subscriber purchases a new telephone service, an RCMAC technician might enter the data for modifying that subscriber's profile in the serving end office switch, to activate the newly subscribed service.

In existing RCMAC systems, the automated network provisioning elements reject and direct memory change requests that they cannot automatically process to manual processing by the RCMAC staff. Such procedures customarily involve printing orders and manual processing of the orders to assign and complete the memory administration work. Included in the equipment utilized at a typical RCMAC is the Memory Administration Check System (MARCH) or MACNET 14. MARCH qualifies the data, and if the data meets the relevant qualification criteria, MARCH transmits the data to the appropriate central office switch for entry into memory.

However, MARCH also recognizes a certain percentage of memory orders as unacceptable for such automatic processing. The service order may not qualify for automatic flow-through directly to the switch because of the order format or the type of service ordered. Current examples of service orders that are not amenable to the automatic entry into the switch include orders for Centrex and ISDN services. It has been estimated that March disqualifies 25% or more of all memory related service orders.

In the existing system, MARCH directs or 'dumps' the unaccepted orders to a batch printer in the RCMAC for manual entry. The output of this printer comprises a series of order packs or so called PACs. Referring to FIG. 2 there is shown in diagrammatic illustration a series of order PACs 17, 19, and 21, which have been produced by the batch printer and directed to the RCMAC for manual handling. The PACs 17, 19, and 21 represent typical PACs which here are illustrated as having been 'dumped' to the RCMAC on December 15, December 16, and December 17, respectively.

A technician in the RCMAC translates one message from the PAC output by the MARCH system into a format appropriate for entry into the particular switch to effectuate the customer's service request. For this purpose, the technician operates a terminal in communication with MARCH, to input the translated message back into MARCH for final processing and delivery to the serving central office switch and entry into memory.

MARCH will typically hold orders until the date they are due. If revisions come in before entry, MARCH will modify the order essentially by overlaying the revision onto the existing order. However, once the RCMAC instructs the MARCH to process a day's flow-through work, MARCH disqualifies any subsequent revisions relating to an order and prints those orders out in one of the day's PACs. One of the technicians in the RCMAC manually enters each subsequent revision, in the manner outlined above. Also, for the cases where the order is otherwise disqualified, e.g. for a service such as ISDN that is not amenable to flow-through automated processing, MARCH will print out all of the revisions serially in the PAC(s). The technician must then process each order and revision thereof to finally produce the memory data for input to the switch to provide the customer the actual service(s) requested.

In FIG. 2 it will be seen that the order designated 1 was printed in a PAC first on December 15 as due on December 17. The same PAC includes supplements in the same PAC which are designated 1-A, 1-B, and 1-C. A still further supplement was received as 1-D on December 16 in a new PAC. On that date the order was completed by a technician separately processing orders 1–1-A-D. However, subsequent to that processing additional supplements were received on December 16 and December 17 for completion on December 17. Thus still additional processing of this order by the technician must occur before it is actually complete.

Referring back to FIG. 1 the remaining architecture in a typical provisioning installation is described. The Remote Memory Administration System 16 is connected to MARCH and to the central office (CO) switch 18. The MARCH/MACNET, RMAS and switch are all connected to the Datakit Network as is conventional and as indicated at 15, 17 and 19. At the same time that the switch memory change is entered, a copy of the order is sent to the Advanced Service Assurance Verification Platform (ASAVP) processor 20, as is described in greater detail in U.S. Pat. No. 5,428,679, referenced hereinabove. That patent is incorporated herein by reference in its entirety.

The ASAVP processor operates in conjunction with the Service Assurance Voice System (SAVS) processor 22. The Service Assurance Voice System processor may be a CSC/Intellicom product or the like providing Integrated Voice Response (IVR) functions which are, of themselves, known and provided by processors sometimes called Voice Processing Units (VPUs).

The invention provides a fully automated management and tracking of the orders output from MARCH/MACNET to the RCMAC for manual entry. An RCMAC technician works at one of a number of X-terminals 31 connected through a local area network to a host computer 33 running a unique RCMAC Tracker Software Application here called Tracker. The host or Tracker computer 33 in turn communicates with the main frame computer 14 running as MARCH/MACNET. The X-terminal 31 may be a product such as the product called X-Links available from CSC/Intellicom and a subsidiary.

Pursuant to the invention, one of the technicians may open a MARCH/MACNET window on the X-terminal 31 and request a PAC. According to another embodiment, the terminal or the host computer 33 may periodically request the PAC, without need for action by the technician. Instead of requesting that MARCH send the PAC to the batch printer, as in the past, the new PAC command according to the invention, requests that MARCH download the PAC to the particular technician terminal. As MARCH transmits the PAC to the terminal, the orders flow across the display screen until the PAC is finished. The last item of the PAC is a list of orders, and that list remains displayed on the terminal screen (in the MARCH window) when the PAC download is complete. The downloaded data for the particular terminal, in this case the entire PAC and the accompanying list, is stored in the host computer.

As part of the processing of the PAC data for storage, a C-program running in the host computer takes the PAC data and cuts that data into individual orders. For each order, the host computer stores a database entry in an INFORMIX database and stores the actual order as an ASCII code file. Each database entry contains a variety of data fields relating to certain aspects of the order that may be used to classify the order, such as the order number, the telephone number, the switch, etc. As the program cuts out the individual orders, it extracts the appropriate data from the orders to populate the data fields in the corresponding database entries.

The RCMAC Tracker Software Application is an application program written for an INFORMIX database. The application provides a variety of windowed access screens to obtain information from the database and to launch related applications.

The RCMAC Tracker Software Application includes two components or modules. The first module manages and tracks the manual order processing. The second module provides an internal trouble ticket processing system.

The module for managing and tracking manual order processing actually drives the work to individuals at respective X-terminals, automatically. Only one terminal 31 is shown in FIG. 1 for purposes of convenience. Typically, orders for memory related work for one central office switch map to a plurality of different ones of the terminals. As such, several people may work on orders relating to any one switch. The RCMAC Tracker Software Application provides a notification window on each terminal. The Tracker Software prioritizes the orders for each office by the date due and generates a display of the next date due order, for an office mapped to each respective terminal, in the notification window shown on the terminal.

When a technician selects an order to work on, the terminal notifies the host of the technician's acceptance of that order. The host records the acceptance, including the log-on ID of the accepting technician, in the database. If another technician attempts to select the same order, the host computer provides a message in the notification window indicating the prior acceptance. Anyone checking the status of the order can review the entire database listing for the order, in this case including the acceptance by a particular RCMAC technician for processing.

Also, in response to the acceptance of the order, the system opens an order display window on the terminal and displays the full order. The order displayed is essentially the same as the order that which was previously printed out in the PAC from MARCH, and the technician or user has the option to print out the accepted order on a local printer.

Typically, the order is several pages long (up to one hundred pages). One section of the order includes assignment information, and another section includes service and equipment information. The order window provides a split screen display, with the assignment information in one section of the window and the service and equipment information in the other section of the window. The window display program permits the user to independently scroll through each section of the order, for example to match up related pieces of assignment information and service and equipment information.

It is a key feature of the invention that the RCMAC Tracker Software Application running in the host computer overlays revisions on a service order, to produce a single final service order for delivery to the technician at acceptance. All prior versions or revisions of the actual order are deleted at the time of access or acceptance of the order by the technician. When the RCMAC technician selects the order, the system presents and displays only the final revised form of the order. The order is overlayed in the ASCII file archive which is called up. On the other hand multiple copies of the information as received are retained in the basic database.

Referring to FIG. 2, if a technician using an X-terminal such as X-terminal 31 were to access in his or her terminal order 1 on December 15, the order window on the X-terminal screen would show only a single order. In this instance that order would be order 1-C overlayed on orders 1, 1-A, and 1-B. If the technician had instead accessed the order on December 16, the order appearing in his or her window would be order 1-E. This system and methodology make it possible to translate two and a half hours of PAC printing to a processing time of about three minutes.

As described, the RCMAC Tracker Software Application provides a windowed display of the order to the technician via the technician's X-terminal. While the terminal displays the order, the technician will open a separate MARCH window on the terminal. The technician reviews the order and writes the relevant order information into the MARCH window. The order entry involves manual typing of information into a template in the MARCH window. In the current implementation of the Software Application, if appropriate, the technician can cut and paste information from the order window directly into the MARCH template. Pursuant to another embodiment, the system may provide the intelligence for hot key or tool-bar entry of relevant information (such as USOC codes) and/or automatic translation of certain order fields into appropriate entries for use in the particular MARCH template. When the order entry job is complete, the host computer forwards the message to MARCH for entry into the particular central office switch. The host also makes a notation of completion in the database, including the log-on code of the technician who processed the order.

The order database, formed during processing of the PAC, is an INFORMIX database. The order receipt processing extracts various useful information from each order and places the information in the appropriate field of an entry in the database. As the order is processed in the RCMAC, the database application program adds appropriate status information in the listing. Although the actual orders are stored for a relatively short period of time (e.g. thirty days), the database entries are stored longer (e.g. a year) for historical analysis.

In addition to the management of order entry, the database also provides a variety of work flow tracking tools. For example, the database is searchable for any of a variety of different types of classification information, such as by switch or by type of service (e.g. Centrex or ISDN). The database can provide reports of the number of orders processed by each RCMAC technician, the number of orders received within a given time period, the number of orders processed in a given time period, the percentage of orders completed by due date, etc.

The analytical tools also help in further improvements to the automated flow-through type order processing. For example, the database may show that all orders of a particular type are dropping out to the RCMAC, such as orders relating to a remote switch module where MARCH was not aware of that module associated with the particular switch. Upon recognition of this problem with the flow-through processing, a new table can be developed in MARCH to facilitate automatic handling of the particular type of orders. This increases the percentage of orders automatically flowing through to the switches and reduces the manual workload on the RCMAC.

As noted above, the RCMAC Tracker Software Application also facilitates response to trouble tickets. A trouble ticket is generated when a technician in the field or an agent in the business office with a customer complaint, calls in to the RCMAC indicating that a service order has not resulted in actual activation of a service. For example, a technician installing new telephone service might find that the switch is not providing dial tone over a particular piece of office equipment. The technician calls the RCMAC with the order number to determine if the switch has been programmed to provide dial tone via that equipment.

In response to a trouble ticket call, the RCMAC technician opens a Tracker window on his or her X-terminal and enters the order number. The trouble ticket module of the RCMAC Tracker Software Application accesses the database on the host computer to determine the current status of the order and display that status on the terminal. The technician can provide the calling party with immediate feedback of the order status. The database entry for each order can be accessed using any data in the database entry, such as telephone number, service order number, etc.

The trouble ticket response portion of the system currently processes only the orders downloaded in the PACs for manual entry. The invention also comprehends that the RC-MAC Tracker Software Application also may track flow-through order processing by MARCH as well as processing of 'rejects' (orders passed through MARCH that the switch rejects for any reason).

Pursuant to another feature of the invention the RCMAC Tracker Software Application may communicate with terminals used in the network test center. When a technician in the test center inputs a trouble ticket relating to a particular order, the Software Application may notify the technician of any order pending or completed related to that number. Without such correlation of order processing, the test center technician today may not know that the order is pending in the RCMAC for processing and might enter the relevant data directly in the switch to clear the trouble that the customer reported.

According to a still further feature of the invention, upon completion of an order by the Tracker Application as described a Tracker feed is delivered to the Advanced Assurance Voice Platform (ASAVP) 20. The ASAVP parses the order and determines what should be in the switch. The ASAVP then polls the switch via the Datakit to determine what it has implemented and matches the two. It there is a reject it is immediately returned to Tracker.

If the service is correctly installed in the switch, The SAVS platform calls the customer at the appropriate Central Office (CO) 18 and waits for an utterance. Upon detecting an utterance such as "Hello" it delivers a programmed message such as "The Call Waiting that you ordered from C&P Telephone Company has now been activated on your line." It may repeat this announcement 3 times. This constitutes a verification to the customer that their newly ordered service is installed, that is, service provisioning verification.

Referring to FIG. 1 it is seen that the ASAVP platform 20 is connected to a LAN 24, such as the AT&T Star Server LAN, via a connection of the Datakit Network indicated at 28. The foregoing description has explained the automatic verification process in the instance where correct installation of the service can be confirmed by the ASAVP processor. In those instances where the attempted verification indicates a problem a message is sent from the ASAVP to the host processor, to SOAC, and to the systems indicated at 26, which are included in or under the control of the existing business office systems network. This may be referred to as customer related operations. These include SOAC, Billing and Order Support System (BOSS), Loop Maintenance and Operations System (LMOS), and Computer System for Mainframe Operations (COSMOS). As previously explained, SOAC is the service order system that issues service orders and actually maintains a copy of the current service order. BOSS is the business office service system containing account information. LMOS is the maintenance system that keeps track of cable paths. COSMOS is the central office record keeping system that keeps track of telephone numbers.

The connection to the business or service related systems is made through VTAM 25 which is a Virtual Terminal Access Method Network which permits connecting these various billing and service order functions together. It may be referred to as a business office network. Technical Network or operating functions indicated at 29 (Central Offices, SCCS, BTT, MSS and RMAS) are connected to the Datakit Network at 28 to LAN 24. This may be called a technical network or operating network. In contrast to this technical network, the personnel connected with the customer related functions accessed by the VTAM network 25 are non-technical personnel who it is desired to isolate from the technical Datakit Network. This may be called the business office systems network sometimes referred to as VTAM. Likewise, it is desirable to provide isolation of the technical personnel accessing the technical side of the system in the Datakit Network from the VTAM or host side. The primary systems indicated at 26 in FIG. 1 are on the VTAM network.

When attempted verification or a customer complaint indicates a problem, the operator needs access to multiple systems and currently makes multiple connections to access these systems. These multiple connections are obviated by providing common access to both the VTAM business system and Datakit operating or technical network via the LAN 24. This access to the business facilities on the one hand and the technical network facilities on the other hand permits not only identification of errors in installation, but also the virtually immediate correction of such errors. In order to eliminate multiple connections or calls to provide this functionality, a multiple window processor is provided. This is shown as an X-Window Manager at 30.

On detecting an error it is necessary to access multiple databases. This is accomplished via the X-Window Manager processor 30. This processor terminal provides access to the multiple separate databases and can automatically bring up on the screen the business and information from the business office databases such as COSMOS, LMOS and SOAC, as well as the technical information from the network side such as the CO switches, RCMAC or RMAS and the adjunct or multi-service platform switches. In addition to the foregoing, the terminal 30 has access to the databases in the ASAVP. The processor 30 is preferably operated in a multitasking mode. At this point the nature of the error can be ascertained. Thus the operator could see that Call Waiting is missing, by way of example, and then originate from the terminal 30 the necessary communications instructions to rectify the error. This provides the ability to provision, confirm, rectify and otherwise manipulate numerous services and functions. Following this identification and correction of the error, a signal is sent via the link 28 to the ASAVP which thereupon confirms the operation and availability of the service to the subscriber in the manner explained above.

It will be apparent from the foregoing that the system and methodology of the invention greatly expedites the processing of those switch memory changes that must be manually handled. This procedure is significantly automated to provide increased productivity along with an effective mechanism to manage and quantify work load and its successful and authenticated completion. Orders are mechanically sorted and displayed at the work stations of the technicians. RCMAC programmers have the option to print the order or to work from the electronically displayed image of the overlayed order and thereby completely eliminate the need for printing. Work can be quantified and tracked electronically.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of provisioning program controlled switches in a switched telecommunications network wherein said switches are connected to local links to customer premises, comprising the steps of:

receiving verbal orders for services to be provided customers served by said local links;

translating said verbal orders for services to digital machine language and storing said orders;

processing a first category of said orders pursuant to a first program;

inputting said orders processed pursuant to said first program to ones of said program controlled switches connected by ones of said local links to the respective customer premises of the customers placing said orders;

processing a second category of said orders pursuant to a second program to overlay multiple orders relating to the same one of said local links;

displaying in a first window of a windowed display data representing one of said second category of orders which have been processed pursuant to said second program;

simultaneously displaying in a second window of said windowed display a plurality of parameters relating to inputting of said second category order to a program controlled switch;

manually processing said data displayed in said first window by manually entering into said second window at least certain of said manually processed data;

processing said manually entered data pursuant to at least a portion of said first program; and inputting said processed manually entered data to a program controlled switch connected to a local link to which said order of said second category pertains.

2. A method according to claim 1 including the step of comparing said manually processed data submitted to processing pursuant to at least a portion of said first program to data in said program controlled switch connected to said local link to which said order of said second category pertains.

3. A method according to claim 2 including the step of delivering to said local link to which said order of said second category pertains a verbal confirmation that the processing of said order of said second category has been completed.

4. A method of provisioning program controlled switches in a switched telecommunications network wherein said switches are connected to local links to customer premises, comprising the steps of:

receiving verbal orders for services to be provided customers served by said local links;

translating said verbal orders for services to digital machine language and storing said orders;

processing a first category of said orders pursuant to a first program and inputting resulting data to program controlled switches to which said first category of orders pertain;

processing a second category of said orders and overlaying multiple orders relating to the same local link;

displaying in a first window of a windowed display data representing one of said overlayed orders;

simultaneously displaying in a second window of said windowed display a plurality of parameters;

processing said data displayed in said first window by manually entering into said second window data derived from said first window relating to said parameters; and inputting resulting data to a program controlled switch connected to a local link to which said order of said second category pertains.

5. A method according to claim 4 including the step of comparing said resulting data to data detected in said program controlled switch connected to said local link to which said order of said second category pertains.

6. A method according to claim 5 including the step of delivering to said local link to which said order of said second category pertains a verbal confirmation that the processing of said order of said second category has been completed.

7. A method of provisioning program controlled switches in a switched telecommunications network wherein such switches are connected to local links to customer premises, comprising the steps of:

receiving verbal orders for services to be provided customers served by said local links;

translating said verbal orders for services to digital machine language and storing said orders;

processing a first category of said orders pursuant to a first program;

inputting said orders processed pursuant to said first program to said program controlled switches linked to the respective customer premises of the customers placing said orders;

processing a second category of said orders whereby plural orders relating to the same link to customer premises are overlayed and stored;

displaying in a first window of a plurality of windowed displays data representing one of said second category orders;

simultaneously displaying in a second window of at least one of said windowed displays a plurality of parameters relating to inputting of said second category order to a program controlled switch;

manually entering into said second window of said one of said windowed displays data derived from said data displayed in said first window of said windowed display;

inputting resulting data to a program controlled switch connected to a local link to which said order of said second category pertains; and displaying in any additional window in an additional windowed display displaying said data from which data has been derived and entered into said second window an indication that said data has been processed.

8. A method of provisioning program controlled switches in a switched telecommunications network wherein said switches are connected to local links to customer premises, comprising the steps of:

receiving verbal orders for services to be provided customers served by said local links;

translating said verbal orders for services to digital machine language and storing said orders;

processing a first category of said orders pursuant to a first program and inputting resulting data to program controlled switches to which said first category of orders pertain;

processing a second category of said orders and overlaying multiple orders relating to the same local link;

displaying in a first window of a windowed display data representing one of said overlayed orders;

simultaneously displaying in a second window of said windowed display a plurality of parameters;

processing said data displayed in said first window by manually entering into said second window data derived from said first window relating to said parameters;

inputting resulting data to a program controlled switch connected to a local link to which said order of said second category pertains; and displaying in any additional window in an additional windowed display displaying said data representing one of said overlayed orders an indication that said data has been processed.

9. In a switched telecommunications network including program controlled switching systems connected by local links to customer premises served thereby and a business office receiving verbal orders for services, a system for provisioning said switching system to provide said services, said provisioning system comprising:

a first processor translating said verbal orders to digital machine language;

a second processor processing orders in said digital machine language into first and second categories and translating said orders in said first category into a signal input into the switching systems to which to which said first category orders pertain;

a third processor displaying said orders of said second category in a windowed display wherein multiple orders for the same local link are displayed in an overlayed form;

a terminal connected to said third processor whereat information displayed in said windowed display is manually processed for input to said switching systems.

10. A system according to claim 9 including comparator and voice processing processors confirming to the customer by verbal signal the installation of the service ordered by the customer.

11. A system according to claim 10 wherein said comparator processor authenticates the accuracy of the installation of the service ordered by the customer.

12. A system according to claim 9 wherein said second processor is in a Recent Change Memory Administration Center.

13. A system according to claim 9 wherein said second and third processors are in a Recent Change Memory Administration System.

14. In a switched telecommunications network including program controlled switching systems connected by local links to customer premises served thereby and a business office receiving verbal orders for services, and a system for provisioning said switching systems to provide said services, including a plurality of processors, at least one of said processors having a terminal connected thereto;

a method comprising the steps of:
- translating said verbal orders to digital machine language in one of said processors;
- processing said orders in said digital machine language into first and second categories in another of said of said processors;
- translating said orders in said first category into a signal input into the switching systems to which to which said first category orders pertain in said another of said processors;
- displaying said orders of said second category in a windowed display at said terminal so that multiple orders for the same local link are displayed in an overlayed form; and
- manually processing said displayed orders for input to at least one of said switching systems.

15. A method according to claim 14 wherein said processors in which said orders are processed into digital machine language and separated into first and second categories are in a Recent Change Memory Administration Center.

16. A method of provisioning program controlled switches in a switched telecommunications network wherein said switches are connected to local links to customer premises, comprising the steps of:
- receiving verbal orders for services to be provided customers served by said local links;
- translating said verbal orders for services to digital machine language;
- processing a first category of said orders and inputting said processed orders to ones of said program controlled switches connected by ones of said local links to the respective customer premises of the customers placing said orders;
- processing a second category of said orders to overlay multiple orders relating to the same one of said local links to customer premises;
- displaying in a first window of a windowed display data representing one of said second category of orders which has been overlayed;
- simultaneously displaying in a second window of said windowed display a plurality of parameters relating to inputting of said second category order to a program controlled switch;
- manually processing said data displayed in said first window by entering into said second window at least certain of said manually processed data;
- processing said manually entered data; and
- inputting said processed manually entered data to a program controlled switch connected to a local link to which said order of said second category pertains.

17. A method according to claim 16 including the step of comparing said manually processed data to data in said program controlled switch connected to said local link to which said order of said second category pertains.

18. A method according to claim 17 including the step of delivering to said local link to which said order of said second category pertains a verbal confirmation that the processing of said order of said second category has been completed.

19. A method according to claim 18 wherein said processing of said first category of orders and processing of said second category of orders to overlay multiple orders relating to the same one of said local links to customer premises is conducted in a Recent Change Memory Administration Center.

20. In a switched telecommunications network including program controlled switching systems connected by local links to customer premises served thereby, and a business office receiving verbal orders for services, and a system for provisioning said switching system to provide said services, including a plurality of processors, at least one of said processors having a terminal connected thereto;

a method comprising the steps of:
- receiving verbal orders for services to be provided customers served by said local links;
- translating said verbal orders for services to digital machine language;
- processing a first category of said orders and
- inputting said processed orders to ones of said program controlled switches connected by ones of said local links to the respective customer premises of the customers placing said orders;
- processing a second category of said orders to overlay multiple orders relating to the same one of said local links to customer premises;
- displaying in a first window of a windowed display in said terminal data representing one of said orders which has been overlayed;
- simultaneously displaying in a second window of said windowed display in said terminal a plurality of parameters relating to inputting of said overlayed order to a program controlled switch;
- manually processing said data displayed in said first window by entering into said second window at least certain of said manually processed data;
- processing said entered data; and
- inputting said processed entered data to a program controlled switch connected to a local link to which said order of said second category pertains.

* * * * *